United States Patent
Hu et al.

(10) Patent No.: US 9,753,717 B2
(45) Date of Patent: Sep. 5, 2017

(54) TIMING REPORT FRAMEWORK FOR DISTRIBUTED SOFTWARE UPGRADES

(71) Applicant: Oracle International Corporation, Redwood Shores, CA (US)

(72) Inventors: Fang Hu, Dublin, CA (US); Chi Kin Vong, Chandler, AZ (US); Tim Richardson, Mesa, AZ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/935,112

(22) Filed: Nov. 6, 2015

(65) Prior Publication Data

US 2016/0132316 A1 May 12, 2016

Related U.S. Application Data

(60) Provisional application No. 62/076,448, filed on Nov. 6, 2014.

(51) Int. Cl.
*G06F 9/44* (2006.01)
*G06F 9/445* (2006.01)
*H04L 29/08* (2006.01)

(52) U.S. Cl.
CPC ............... *G06F 8/65* (2013.01); *H04L 67/34* (2013.01)

(58) Field of Classification Search
CPC ....................................................... G06F 8/65
See application file for complete search history.

(56) References Cited

U.S. PATENT DOCUMENTS

| | | | |
|---|---|---|---|
| 5,862,325 A | 1/1999 | Reed et al. | |
| 6,088,717 A * | 7/2000 | Reed | H04L 29/06 707/999.01 |
| 6,314,567 B1 | 11/2001 | Oberhauser et al. | |
| 6,360,366 B1 * | 3/2002 | Heath | G06F 8/65 709/201 |
| 6,633,899 B1 | 10/2003 | Coward | |
| 6,775,830 B1 | 8/2004 | Matsunami et al. | |
| 6,779,028 B1 * | 8/2004 | Nakamura | H04L 41/0803 709/205 |
| 7,191,187 B2 | 3/2007 | Takeshita et al. | |
| 7,457,880 B1 | 11/2008 | Kim | |

(Continued)

OTHER PUBLICATIONS

U.S. Appl. No. 14/838,184, Non-Final Office Action mailed on Aug. 11, 2016, 15 pages.

(Continued)

*Primary Examiner* — Chameli Das
(74) *Attorney, Agent, or Firm* — Kilpatrick Townsend & Stockton LLP

(57) ABSTRACT

Techniques for concurrently upgrading one or more software applications hosted by one or multiple hosts. Checkpoint data associated with the upgrade processes executing on the multiple hosts may be generated during the overall upgrade operation. The checkpoint data may be stored in a shared storage that can be accessed by the upgrade processes. A reporting tool may generate a timing report using the checkpoint data. The timing report may indicate execution timing data of all hosts executing the upgrade processes such as the total time spent for each upgrade process, when an upgrade process started execution, when an upgrade process stopped and/or completed execution, and the like.

22 Claims, 7 Drawing Sheets

(56) References Cited

U.S. PATENT DOCUMENTS

| | | | |
|---|---|---|---|
| 7,584,467 B2 | 9/2009 | Wickham et al. | |
| 7,739,677 B1 | 6/2010 | Kekre et al. | |
| 8,346,913 B2 | 1/2013 | Gao et al. | |
| 8,589,535 B2 | 11/2013 | Calder et al. | |
| 8,752,040 B2* | 6/2014 | Halliday | G06F 17/30306 717/172 |
| 9,032,053 B2 | 5/2015 | Kosuru et al. | |
| 9,185,514 B1 | 11/2015 | Reeves et al. | |
| 2003/0005351 A1 | 1/2003 | Lim | |
| 2004/0003352 A1 | 1/2004 | Bargeron et al. | |
| 2004/0010808 A1 | 1/2004 | deCarmo | |
| 2004/0012613 A1 | 1/2004 | Rast | |
| 2004/0030567 A1 | 2/2004 | Takeshita et al. | |
| 2004/0044736 A1 | 3/2004 | Austin-Lane et al. | |
| 2004/0103411 A1* | 5/2004 | Thayer | G06F 8/65 717/171 |
| 2006/0010233 A1 | 1/2006 | Fellenstein et al. | |
| 2006/0015861 A1* | 1/2006 | Takata | G06F 8/67 717/168 |
| 2006/0218545 A1 | 9/2006 | Taguchi | |
| 2006/0240803 A1 | 10/2006 | Valeriano et al. | |
| 2008/0133741 A1* | 6/2008 | Kubota | G06F 9/5055 709/224 |
| 2008/0168434 A1 | 7/2008 | Gee et al. | |
| 2008/0244555 A1 | 10/2008 | Welvaert et al. | |
| 2008/0250405 A1 | 10/2008 | Farhangi et al. | |
| 2009/0248801 A1 | 10/2009 | Then et al. | |
| 2010/0125849 A1* | 5/2010 | Oswald | G06F 9/4881 718/103 |
| 2010/0235823 A1 | 9/2010 | Garbers et al. | |
| 2011/0289498 A1 | 11/2011 | Xie et al. | |
| 2012/0005316 A1* | 1/2012 | Perry | H04L 65/4069 709/219 |
| 2012/0066380 A1 | 3/2012 | Gao et al. | |
| 2012/0204171 A1 | 8/2012 | Reisman | |
| 2013/0174178 A1* | 7/2013 | Chakraborty | G06F 11/3672 718/105 |
| 2013/0263104 A1 | 10/2013 | Baset et al. | |
| 2013/0291099 A1 | 10/2013 | Donfried et al. | |
| 2013/0346922 A1 | 12/2013 | Shiplacoff et al. | |
| 2014/0096076 A1 | 4/2014 | Ashbrook et al. | |
| 2014/0189030 A1 | 7/2014 | Benchenaa et al. | |
| 2014/0298196 A1 | 10/2014 | Aoyama et al. | |
| 2014/0304714 A1 | 10/2014 | Shapiro | |
| 2014/0317522 A1 | 10/2014 | Lucero et al. | |
| 2015/0067819 A1* | 3/2015 | Shribman | H04L 67/06 726/12 |
| 2015/0178066 A1 | 6/2015 | Horn et al. | |
| 2015/0193222 A1* | 7/2015 | Pirzadeh | G06F 8/65 717/168 |
| 2016/0028667 A1 | 1/2016 | Faaborg et al. | |
| 2016/0066145 A1 | 3/2016 | Pietraniec et al. | |
| 2016/0070558 A1 | 3/2016 | Hu et al. | |
| 2016/0092310 A1 | 3/2016 | Peacock et al. | |
| 2016/0124741 A1 | 5/2016 | Hu et al. | |
| 2016/0132318 A1 | 5/2016 | Hu et al. | |

OTHER PUBLICATIONS

What is Prevayler?, Prevayler, Version 2.6, http://prevayler.org/, Jan. 15, 2013, 1 page.

U.S. Appl. No. 14/925,354, Non-Final Office Action mailed on Oct. 20, 2016, 12 pages.

Dumitras et al., Why Do Upgrades Fail and What Can We Do about It? Toward Dependable, Online Upgrades in Enterprise System, IFIP International Federation for Information Processing, 2009, pp. 349-372.

Greene, SCOM 2012—Configuring Application Performance Monitoring (APM) Part 3, IT Blog, http:/lkevingreeneitblog.blogspot.com/2012/03/scom-2012-configuring-application_49.html, Mar. 2012, 9 pages.

Microsoft, Orchestration Suspended Instances Availability Monitor Monitor, http://mpwiki.viacode.com/default.aspx?g=posts&t=164367, Oct. 2013, 2 pages.

Vancauwenberghe, Monitoring suspended orchestrations using System Center Operations Manager, Codit Blog., Feb. 14, 2014, 8 pages.

U.S. Appl. No. 14/935,254, Non-Final Office Action mailed on Dec. 14, 2016, 16 pages.

U.S. Appl. No. 14/838,184, Final Office Action mailed on Feb. 14, 2017, 17 pages.

U.S. Appl. No. 14/925,354, Notice of Allowance dated Apr. 12, 2017, 8 pages.

U.S. Appl. No. 14/838,184, "Notice of Allowance", dated Jun. 8, 2017, 10 pages.

U.S. Appl. No. 14/935,254, Final Office Action dated May 23, 2017, 19 pages.

\* cited by examiner

TIMING REPORT FRAMEWORK FOR DISTRIBUTED SOFTWARE UPGRADES

CROSS-REFERENCES TO RELATED APPLICATIONS

This application is a non-provisional of and claims the benefit of and priority to U.S. Provisional Application No. 62/076,448, filed Nov. 6, 2014 and entitled "TIMING REPORT FRAMEWORK FOR DISTRIBUTED SOFTWARE UPGRADES," the entire disclosure of which is incorporated herein by reference for all purposes.

BACKGROUND

The term upgrading a software application generally refers to the process of replacing an existing version of the software application with a newer version or adding a new version of the software application where none previously existed. A software upgrade may be performed for various reasons such as to add one or more features, remove one or more features, modify one or more features from an existing version of the software, remove bugs or errors, improve the software efficiency, and other reasons. An upgrade is generally performed to enhance the performance of the software application.

Many modern computing environments typically include a framework of multiple software applications, which may be developed by different third-party entities. Each software application may include zero or more plugins. The plugins may include software components that add a new utility/feature or enhance the utilities/features of a software application. The applications may run on or be hosted by multiple host machines ("hosts") in a distributed environment, with each host potentially hosting multiple applications. Performing an upgrade operation in such a distributed environment comprises multiple upgrade processes executed by multiple hosts such that one or more upgrade processes may be executed to upgrade each application. Many of the upgrade processes may be executed in parallel. Possible dependencies among the upgrade processes further complicate the overall upgrade.

Some conventional upgrade mechanisms include a framework for generating timing reports but the information shown by these reports is very limited. For example, while conventional reports may show the start and end time of an overall upgrade operation that comprises multiple upgrade processes running on multiple host machines and total time of the overall upgrade executing on the multiple host machines, they fail to show useful information such as timing information for each host machine among the multiple host machines. The existing timing report tools are not able to distinguish between the execution time of upgrade processes on a given host, the operational idle time (i.e., idle time) of the host (e.g., when no upgrade processes execute on the host) and the time the host spent on coordinating with peer hosts. In addition, existing timing report tools are not able to report how many times the upgrade processes are re-run.

In some implementations, a reporting tool may use log files generated on the one or more hosts involved in the upgrade operations to generate a timing report. In such an implementation, each host involved in the upgrade operation is forced to store log files storing some timing information associated with that host. Further, all the log file generated by the multiple hosts have to follow the same logging format (e.g., use the same nomenclature to mark the milestones of the upgrade processes running on each host) so that the reporting tool can parse the logs appropriately in order to generate the timing report. A log-based timing report system also is not extensible, for example when a new host is added to the overall upgrade operation. In addition, log files occupy a lot of memory resources and, as a result, some implementations may not archive the log files, or may purge the archived log files due to disk space limitations. In such implementations, the log-based timing report solutions do not work properly. Moreover, when multiple upgrade processes are executed concurrently, a user will have to manually review the log files to find overlapping execution times among hosts. The task becomes even more difficult when the log files do not distinguish between the times when upgrade processes execute on the host and no upgrade processes execute on the host. Additionally, the log files may be stored at multiple locations on multiple hosts and some may not be accessible due to a variety of reasons, such as, security concerns. This prevents a reporting tool from generating a comprehensive image of all the upgrade processes running on multiple hosts as part of the overall upgrade operation.

BRIEF SUMMARY

According to an embodiment of the present invention, an improved upgrade infrastructure is provided for performing software upgrades in such a distributed heterogeneous environment in an automated and efficient manner. The upgrade infrastructure is configured to initiate and manage an overall upgrade operation that is responsible for performing software upgrades across the multiple hosts. In certain embodiments, as part of the overall upgrade operation, multiple upgrade processes are started and executed on the multiple hosts, where an upgrade process executed on a host is configured to upgrade one or more software applications hosted by that host. In certain embodiments, the upgrade infrastructure provides a shared storage area that can be accessed by the various hosts involved in the upgrade process. While performing an upgrade, an upgrade process may, from time to time, write checkpoint data to the shared storage. The checkpoint data is a snapshot of a particular upgrade process at a given time that comprises information indicative of the upgrade status of that particular upgrade process.

In one embodiment, a timing reporting tool may be provided that can communicate with the shared storage and retrieve timing information stored by the upgrade processes. The timing information for an upgrade process may include, among others, execution timing of an upgrade process, status of the upgrade process, number of times the upgrade process was attempted, coordination time with other upgrade processes hosted by peer hosts, etc. The timing information is obtained through the checkpoints generated while the upgrade processes execute on the hosts. Since the checkpoint data is centrally located on the shared storage, the timing reporting tool may access the checkpoint data of all the upgrade processes hosted by multiple hosts.

The timing reporting tool may then generate one or more timing reports based upon the information read from the shared storage locations. The timing reports may be generated by the timing reporting tool at different granularity levels. For example, one report may be generated at the upgrade-process level, another report may be generated at host-level or multiple hosts-level. In certain embodiments, the information may also be consolidated in a single report for the overall upgrade operation that includes upgrade-process level timing information, milestone-level timing information, host-level timing information and/or multiple hosts-level timing information.

In certain embodiments, techniques (including methods, systems, code or software instructions executed by one or more processors) are provided for executing a first upgrade process on a first host machine for upgrading a first software application on the first host machine. A second upgrade process is executed on a second host machine for upgrading a second software application on the second host machine. A shared storage is provided. In certain embodiments, the shared storage may be provided on the first host machine or the second host machine. The first upgrade process stores first data in the shared storage. The first data may be indicative of a status of the first upgrade process. The second upgrade process stores second data in the shared storage. The second data may be indicative of a status of the second upgrade process. A data processing system may read the first data and the second data from the shared storage. The data processing system may generate a report based upon the first data and the second data read from the shared storage. The report may include timing information associated with the execution of the first upgrade process on the first host machine and the execution of the second upgrade process on the second host machine. In some embodiments, the report may be generated during execution of at least the first upgrade process or the second upgrade process. The report may include a number of times the first upgrade process or the second upgrade process re-started executing. The report may be communicated to a user.

The timing report may provide information associated with at least one of the first host machine and the second host machine. The information associated with the first host machine may include one or more of a total execution time of the first host machine, a total idle time of the first host machine and a time that the first host machine spent coordinating with another host machine. Similarly, the information associated with the second host machine may include may include one or more of a total execution time of the first host machine, a total idle time of the first host machine and a time that the first host machine spent coordinating with another host machine.

According to some embodiments, the report may be displayed on a display device while the first upgrade process or the second upgrade process is executing. In such embodiments, the report may be dynamically updated based on additional data generated during execution of the first upgrade process or the second upgrade process. Dynamically updating the report based on additional data further may include the data processing system reading third data written to the shared storage by the first host machine after the report has been generated based upon the first data and the second data, and updating the report communicated to the user based upon the third data. The report may also be modified to incorporate information associated with additional host machine(s), such as a third host machine.

In certain embodiments, techniques (including methods, systems, code or software instructions executed by one or more processors) are provided for receiving, by a timing reporting tool, a request to generate a report for an upgrade operation. The upgrade processes may generate data, such as checkpoint data, at various time points during their execution. The data for each upgrade process may include information indicative of a status of that upgrade process when the data is generated. The upgrade processes may store the generated data in a shared storage. The upgrade operation may include multiple upgrade processes running on multiple host machines. The timing reporting tool may access a shared storage to read data from the shared storage. The timing reporting tool may read the data stored by the multiple upgrade processes from the shared storage. Using the retrieved data, the timing reporting tool may determine information about upgrade processes that have completed execution, upgrade processes that are currently executing, and upgrade processes to be executed. The timing reporting tool may generate the report based upon the data read from the shared storage, the report comprising timing information associated with the execution of the plurality of upgrade processes running on the plurality of host machines. The report may be communicated to one or more users.

These and other embodiments are described in further detail below.

BRIEF DESCRIPTION OF THE DRAWINGS

Illustrative embodiments of the present invention are described in detail below with reference to the following drawing figures:

FIG. 2A depicts an exemplary timing report for multiple hosts according to an embodiment of the present invention.

FIG. 2B depicts an exemplary timing report at upgrade process level for multiple hosts according to an embodiment of the present invention.

DETAILED DESCRIPTION

Figure 1:
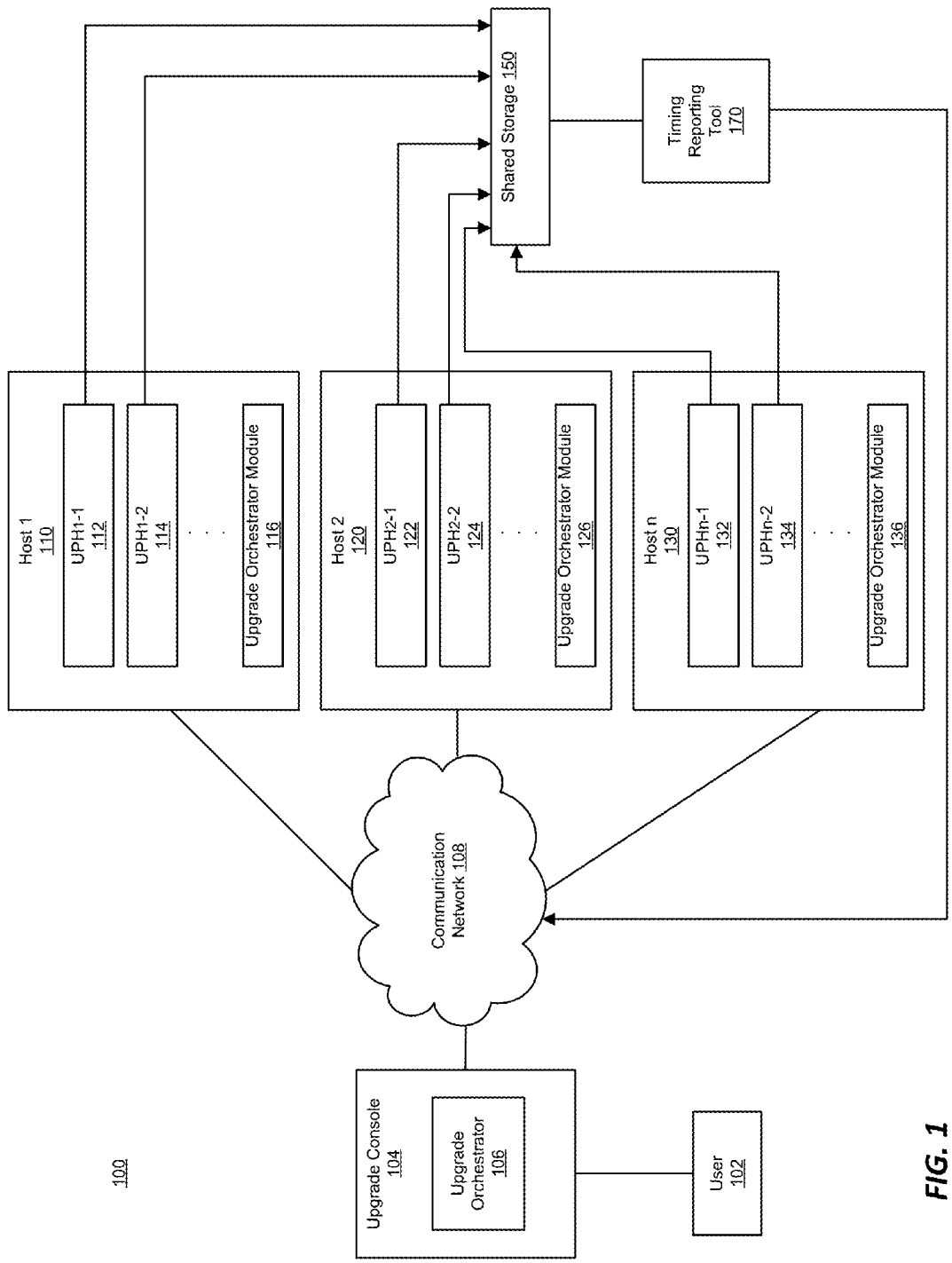
FIG. 1 depicts an upgrade infrastructure for executing multiple upgrade processes on multiple hosts according to an embodiment of the present invention.

In the following description, for the purposes of explanation, specific details are set forth in order to provide a thorough understanding of embodiments of the invention. However, it will be apparent that some embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks.

An improved upgrade infrastructure is provided for performing software upgrades in a distributed heterogeneous computing environment comprising multiple hosts hosting multiple software applications. A host, as used herein, refers to any computing device comprising one or more processors. A host may be configured to host one or more software applications. The configuration (e.g., processing capabilities, memory resource capabilities, networking resource capabilities, operating systems (e.g., Windows, iOS, UNIX, LINUX, etc.) on the hosts, etc.) of a host in the computing environment may be the same as or different from another host in the computing environment. Accordingly, the computing environment in which the software upgrade is to be performed may comprise heterogeneous hosts of different configurations and capabilities.

Various different types of software applications may be hosted by a host or by multiple hosts, such as, without limitation, enterprise applications, resource planning applications, business applications, productivity applications, and the like. The applications hosted by one host may be same as or different from the applications hosted by another host in the computing environment. For example, two hosts may host the same customer relationship management (CRM) application. As another example, a first host may host one or more customer relationship management (CRM) applications while a second host may host one or more supply chain management applications. Further, even for a given software application, different hosts may host different versions of the same application. The software applications hosted by the hosts may be developed by same or different third-party entities.

Due to the heterogeneity of the computing environment, the task of performing software upgrades in such an environment is very complicated. The complexity of performing such a distributed upgrade is impacted and complicated by several factors such as the number of applications that need to be upgraded, the different types of applications, the distributed nature of the applications, potential dependencies between the applications, the number of hosts involved in the upgrade, differences in configurations and/or capabilities of the hosts, potential upgrade dependencies between the upgrade processes that are responsible for upgrading the applications hosted by the same or different hosts, customized upgrade requirements for different applications, and other factors.

According to an embodiment of the present invention, an improved upgrade infrastructure is provided for performing software upgrades in such a distributed heterogeneous environment in an automated and efficient manner. The upgrade infrastructure is configured to initiate and manage an overall upgrade operation that is responsible for performing software upgrades across the multiple hosts. The upgrade infrastructure is configured to initiate and manage an upgrade operation that is responsible for performing software upgrades across the multiple hosts. In certain embodiments, as part of the overall upgrade operation, multiple upgrade processes are started and executed on the multiple hosts, where an upgrade process executed on a host is configured to upgrade one or more software applications hosted by that host. For example, as part of the upgrade, an upgrade process may be configured to replace an existing version of the software application with a newer version or add a new version of the software application where none previously existed. A software upgrade may result in one or more features being added to a software application, one or more features being removed from the software application, one or more features from an existing version of the application being modified, removal of bugs or errors from an application, improvements in the software application performance (e.g., increase in efficiency), and the like.

An upgrade infrastructure, as described herein, enables software upgrades to be performed in a heterogeneous and distributed computing environment in an automated and efficient manner. The upgrade infrastructure enables two or more upgrade processes hosted by the same host or hosted by multiple different hosts to synchronize and coordinate their upgrade activities in an automated manner. In certain embodiments, the upgrade infrastructure provides a shared storage area that can be accessed by the various hosts involved in the upgrade process. While performing an upgrade, an upgrade process may, from time to time, write checkpoint data to the shared storage. The checkpoint data is a snapshot of a particular upgrade process at a given time that comprises information indicative of the upgrade status of that particular upgrade process.

The shared storage discussed above (and below) may be provided in various different ways. In one embodiment, the shared storage may be provided on a central host that is accessible by all upgrade processes executing on all the hosts participating in the overall upgrade. In some embodiments, the shared storage can also be provided on one of the multiple hosts participating in the overall upgrade provided that the shared storage is accessible by all upgrade processes executing on all the hosts.

In one embodiment, a timing reporting tool may be provided that can communicate with the shared storage and retrieve timing information stored by the upgrade processes. The timing information for an upgrade process may include, among others, execution timing of an upgrade process, status of the upgrade process, number of times the upgrade process was attempted, coordination time with other upgrade processes hosted by peer hosts, etc. The timing information is obtained through the checkpoints generated while the upgrade processes execute on the hosts. Since the checkpoint data is centrally located on the shared storage, the timing reporting tool may access the checkpoint data of all the upgrade processes hosted by multiple hosts.

The timing reporting tool may then generate one or more timing reports based upon the information read from the shared storage locations. The timing reports may be generated by the timing reporting tool at different granularity levels. For example, one report may be generated at the upgrade-process level, another report may be generated at host-level or multiple hosts-level. In certain embodiments, the information may also be consolidated in a single report for the overall upgrade operation that includes upgrade-process level timing information, milestone-level timing information, host-level timing information and/or multiple hosts-level timing information.

The timing reporting tool discussed herein may be invoked anytime by, for example, a user. For example, before one or more upgrade processes start execution, while one or more upgrade processes are executing, or after one or more upgrade processes completed execution.

The timing reporting tool may generate reports in various formats, including but not limited to, Extensible Markup Language (XML) reports and HyperText Markup Language (HTML) reports. The generated timing reports may be integrated with any external system via XML streams.

FIG. 1 depicts an exemplary upgrade infrastructure system 100 according to an embodiment of the present invention. The upgrade infrastructure 100 includes multiple hosts 110, 120, 130. While three hosts are depicted in FIG. 1, in alternative configurations more or fewer hosts may be present. The hosts 110, 120, 130 may host multiple software applications (not shown). As part of the overall upgrade operation, multiple upgrade processes 112, 114, 122, 124, 132, 134 may be executed by the hosts 110, 120, 130 to upgrade the software applications hosted by the hosts 110, 120, 130.

In certain embodiments, one or more hosts may be grouped into a pod. A pod, as used herein, defines a modular set of resources including, for example, a specific set of infrastructure, middleware, and/or application resources.

In the embodiment depicted in FIG. 1, the upgrade infrastructure 100 includes an upgrade console 104 in communication with the hosts 110, 120, 130 through a communication network 108. In the embodiment shown in FIG. 1, the upgrade console 104 may be a computing system that a user 102 (e.g., a system administrator) may interact with to initiate and control the overall upgrade operation on the hosts 110, 120, 130. The upgrade console 104 may include an upgrade orchestrator 106 for initiating and managing the overall upgrade operation, including the initiating, coordinating and synchronizing the execution of upgrade processes 112, 114, 122, 124, 132, 134 hosted by the hosts 110, 120, 130. Status information related to the status of the overall upgrade operation may be output to the user via upgrade console 104.

In certain embodiments, the overall upgrade operation may be performed in phases. During each phase, multiple upgrade processes (i.e., tasks) may run on one or more of the hosts 110, 120, 130. The upgrade orchestrator 106 may ensure that a current set of upgrade processes run to successful completion before initiating and proceeding with the next set of upgrade processes. One of ordinary skill in the art will appreciate that the upgrade infrastructure 100 may include any number of components, hosts and upgrade processes. Thus, the upgrade infrastructure 100 is not limited to the components, hosts and upgrade processes illustrated in FIG. 1.

As illustrated in FIG. 1, multiple upgrade processes may be hosted by each one of the hosts 110, 120, 130. For example, upgrade processes 112, 114 may be hosted by host 110, upgrade processes 122, 124 may be hosted by host 120 and upgrade processes 132, 134 may be hosted by host 130. Two or more of the upgrade processes 112, 114, 122, 124, 132, 134 may run in parallel. In some embodiments, two or more of the upgrade processes 112, 114, 122, 124, 132, 134 may be serialized. In some embodiments, the upgrade orchestrator 106 may also synchronize and/or coordinate the execution of two or more of the upgrade processes 112, 114, 122, 124, 132, 134.

In certain embodiments, each host is configured to execute a upgrade orchestrator module that communicates with upgrade orchestrator 106 and facilitates the upgrade activities performed on that host. For example, as depicted in FIG. 1, host 110 executes upgrade orchestrator module 116, host 120 executes upgrade orchestrator module 126, and host 130 executes upgrade orchestrator module 136. In certain embodiments, each upgrade orchestrator module may be a piece of code running on a host for facilitating the upgrade activities. The upgrade orchestrator modules 116, 126, 136 may initiate and control the upgrade processes 112, 114, 122, 124, 132, 134 executed on the hosts 110, 120, 130. The upgrade orchestrator modules 116, 126, 136 may receive and/or respond to commands and instructions from the upgrade console 104 to facilitate the upgrade on the hosts 110, 120, 130.

The upgrade infrastructure 100 also includes a shared storage 150 accessible by the upgrade processes 112, 114, 122, 124, 132, 134. For example, the shared storage 150 may be provided on a central host that is accessible by the upgrade processes 112, 114, 122, 124, 132, 134. In certain embodiments, the central host may be one of the hosts 110, 120, 130 and accessible by the upgrade processes 112, 114, 122, 124, 132, 134. The upgrade processes 112, 114, 122, 124, 132, 134 be hosted by the hosts 110, 120, 130 may write their checkpoint data to the shared storage 150.

The upgrade infrastructure 100 may also include a timing report generator 170 in communication with the shared storage 150. The timing report generator 170 may use the checkpoint data stored in the shared storage 150 to generate one or more timing reports. The timing report(s) may include timing information such as execution timing of an upgrade process, status of the upgrade process, number of times the upgrade process was attempted, coordination time with other upgrade processes hosted by peer hosts, etc. The timing report generator 170 may communicate the timing reports to the user 102 through the communication network 108. In certain embodiments, the timing report(s) may be displayed on the upgrade console 104. The user 102 may get a complete picture of the overall upgrade operation using the timing reports. The timing reporting tool may be executed by a data processing system. In some embodiments, one of the host machines involved in the overall upgrade operation may be configured to execute the timing reporting tool.

The timing report generator 170 may be invoked before the execution of the upgrade processes 112, 114, 122, 124, 132, 134, during the execution of the upgrade processes 112, 114, 122, 124, 132, 134 (i.e., in real-time) or after the execution of the upgrade processes 112, 114, 122, 124, 132, 134 has completed. In certain embodiments, timing reports generated by timing report tool 170 may be communicated to upgrade console 104 and displayed on the upgrade console 104. The reports may be displayed while the upgrade processes 112, 114, 122, 124, 132, 134 are still executing. The timing report generator 170 may dynamically update a timing report displayed on the upgrade console 104 such that new execution data generated during the execution of the upgrade processes 112, 114, 122, 124, 132, 134 is dynamically incorporated into and displayed with the timing report. In this manner, a timing report is dynamic and may be automatically updated as new timing information relevant to that report is available.

The timing report generator 170 may be a dynamic tool such that when a new host is incorporated into the upgrade infrastructure 100, the timing report generator 170 may modify the timing reports to include timing information for the new host. Similarly, when one or more of the hosts 110, 120, 130 are no longer a part of the upgrade infrastructure 100, the timing report generator 170 may modify the timing reports to remove timing information generated by or associated with the removed host(s).

The timing report generator 170 may generate the timing reports in an efficient manner, without requiring extra time to search for and/or parse the log files. All timing data is stored with associated checkpoints while the upgrade executed. Accordingly, there is no extra time needed to parse thousands of log files spanning multiple hosts to locate and extract the timing data. The timing report can be generated for all hosts in the upgrade infrastructure 100 in 1 second. In certain embodiments, the timing report generator 170 is capable of generating a timing report for all hosts (e.g., a thousand hosts) in the upgrade infrastructure 100 in about a few seconds.

The timing report generator 170 may use various techniques to determine timing data such as start time of an upgrade process, start time of a current execution attempt for the upgrade process, end time of the upgrade process, execution time of the current execution attempt for the upgrade process, wait time for the current execution attempt for the upgrade process, total execution time of the upgrade process, idle time of the upgrade process and number of total attempts of the upgrade process. The timing data may have slightly different definitions at various granularity levels. For example, the start time may have different meanings at upgrade process level, at upgrade phase level and at a host level. Table 1 provides a list of exemplary techniques that may be used in calculating the timing data at various granularity levels.

TABLE 1

Exemplary data definitions and characteristics for calculating the timing data at various granularity levels

| Data | Upgrade Process Level | Upgrade Phase Level | Host Level |
|---|---|---|---|
| Start Time | Time since the upgrade process was first started. This time is not changed upon rerun. Start time is not set if the upgrade process has never been started. | Time since the upgrade phase was first started. This time is not changed upon rerun Start time is not set if the upgrade phase has never been started. | Time upon the host was first started. This time is not changed upon rerun. |
| Start Time for the Current execution attempt | Time upon the upgrade process was started or rerun. Start time is not set if upgrade process has not been started for the current execution attempt. | Time upon the upgrade phase was started or rerun. Start time is not set if upgrade phase has not been started for the current execution attempt. | Time upon the host was started or rerun. |
| End Time | Time upon upgrade process completes either successfully or with error. End time is not set when the upgrade process is running. End time is not set if the upgrade process has never been started. | Time upon the upgrade phase completes successfully or with errors. End time is not set when the upgrade phase is running. End time is not set if the upgrade phase has never been started. | Time upon host exits successfully, fails or pauses. End time is not set when the host is running. |
| Execution Time (Run time) for the Current execution attempt | If upgrade process is running: process_ExecutionTimeForCurrentAttempt = "now" − StartTimeForCurrentAttempt Otherwise: process_ExecutionTimeForCurrentAttempt = EndTime − StartTimeForCurrentAttempt | phase_ExecutionTimeForCurrentAttempt = phase_ElapsedTimeForCurrentAttempt − phase_WaitTimeForCurrentAttempt If upgrade phase is running: phase_ElapsedTimeForCurrentAttempt = "now" − phase_StartTimeForCurrentAttempt Otherwise: phase_ElapsedTimeForCurrentAttempt = phase_EndTimeForCurrentAttempt − phase_StartTimeForCurrentAttempt Upgrade phase execution time is not a simple sum of the execution time by each upgrade process, since there may be parallel upgrade processes in the upgrade phase. The above algorithm can avoid the duplicate aggregation on the execution time spent by the parallel upgrade processes. | Aggregate the execution time of phases that have been run for the current execution attempt. |
| Wait Time for the Current execution attempt | Wait time is not set if upgrade process does not need to wait for peer upgrade process to complete. If upgrade process is waiting for the peer upgrade process to complete when generating the report: process_WaitTimeForCurrentAttempt = "now" − StartTimeForCurrentWait If wait completes: process_WaitTimeForCurrentAttempt = EndTimeForCurrentWait − StartTimeForCurrentWait | phase_WaitTimeForCurrentAttempt = Sum(waitForPeerPhase, Sum(non_pending_upgrade processWaitTime), sum(non_pending_synchpoints_ExecutionTime)) Wait Time on the upgrade phase level for the current execution attempt includes: (1) Wait time for the peer upgrade phase to complete for the current execution attempt. (2) Total wait time spent by each upgrade process that have been executed within the upgrade phase for the current execution attempt. (3) Total wait time spent by each synchpoints that have been executed within the upgrade phase for the current execution attempt. | Aggregate the wait time of phases that have been run for the current execution attempt. |
| Total Execution Time (Run Time) | Aggregate the upgrade process execution time of each run. process_TotalExecutionTime = Sum(eachRun_ExecutionTime) | Aggregate the upgrade phase execution time of each run. phase_TotalExecutionTime = Sum(eachRun_ExecutionTime) | Aggregate the host execution time of each run. host_TotalExecutionTime = Sum(earchRun_HostExecutionTime) |
| Total Wait Time | Aggregate the upgrade process wait time of each run. process_TotalWaitTime = Sum(eachRun_WaitTime) | Aggregate the upgrade phase wait time of each run. phase_TotalWaitTime = Sum(eachRun_WaitTime) | Aggregate the host wait time of each run: host_TotalWaitTime = Sum(eachRun_HostWaitTime) |
| Idle Time | — | — | Host idle time is the time elapsed in between each |

TABLE 1-continued

Exemplary data definitions and characteristics for calculating the timing data at various granularity levels

| Data | Upgrade Process Level | Upgrade Phase Level | Host Level |
|---|---|---|---|
| | | | relaunch. IdleTime = (host_TotalElapsedTime − host_TotalExecutionTime − host_TotalWaitTime) |
| Number of execution attempts | Incremented upon the upgrade process is rerun. | Incremented upon the upgrade phase is rerun. | Incremented upon the host is rerun. |

In certain embodiments, the timing report may be used for performance analysis and performance enhancement. Specifically, the timing report providing information for multiple hosts at any given time, may also be used for the performance diagnostic and tuning of the upgrade infrastructure 100. Problems with a given host performance may be identified by comparing and/or analyzing the timing data for that host. The identified problem may be addressed to enhance the performance of that host, and hence, of the upgrade infrastructure. For example, if a timing report indicates that the same upgrade process to be executed on multiple hosts is executed on different hosts at significantly different execution times, then this may indicate some performance issues for hosts on which the process is executed late. As another example, if a timing report indicates that an upgrade process that is run on multiple host machines, takes significantly longer time to complete on a first host 110, compared to other hosts 120, 130 of the same kind, this may be interpreted to indicate a performance issue with host 110, such as hard disk read/write issues, network connection problems, etc. In this manner, the timing report may be used to identify performance problems with hosts involved in the overall upgrade operation. This performance data may then be used to fine tune the upgrade infrastructure 110.

In some embodiments, the timing report may be used by the upgrade console 104 to identify a performance problem or issue, and automatically take corrective action to enhance the performance of the upgrade infrastructure 100. For example, if a timing report indicates that there issues associated with a given host, the upgrade console may take corrective action such as assigning the execution of the upgrade processes to another host and reporting the host to the system administrator for further review. Certain embodiments may use machine learning to determine patterns for corrective action(s) associated with identified problems. This may streamline the automatic correction process.

In certain embodiments, the upgrade console 104 and/or the upgrade orchestrator 106 may restart the execution of the upgrade process(es) on the given host. Alternatively, dependent on the identified problem, the upgrade console 104 and/or the upgrade orchestrator 106 may restart the overall upgrade operation on all hosts. The timing reporting tool 170 may regenerate a timing report. If the new (e.g. updated) timing report identifies the same or similar problems after the restart, a corrective action may be automatically applied. If the new (e.g. updated) timing report does not identify the same or similar problems after the restart, the overall upgrade operation may proceed without taking corrective action. If the new (e.g. updated) timing report identifies new problems, both the previously identified problems and the newly identified problems may be provided (e.g. reported) to the upgrade console 104.

The automatic corrective action may be implemented based on the nature of the identified problems (e.g., errors). For example, the timing report may identify automatically correctable errors such as timeout to obtain certain resources (e.g., timeout to obtain the lock to the file system), or timeout to access to certain network services or databases. For such errors, the overall upgrade operation or the upgrade operations hosted by a given host may be rerun. On the other hand, some types of errors may require a user 102 to review the timing report and may not be suitable for automatic correction. For example, if a required correction for an identified problem is known to be a lengthy and/or risky process, the correction may not be implemented automatically and may be referred to the user 102 for further review.

In certain embodiments, the timing reports generated by timing report generator 170 may communicated to a user 102 through communication network 108. In some embodiments, the reports may be communicated to upgrade console 104 and output (e.g., displayed) to the user using an output device (e.g., a screen, display). In some other embodiments, the timing reports may be communicated to one or more client computing devices used by the user, such as a mobile phone, a laptop, etc. and output via these devices.

Figure 2A:
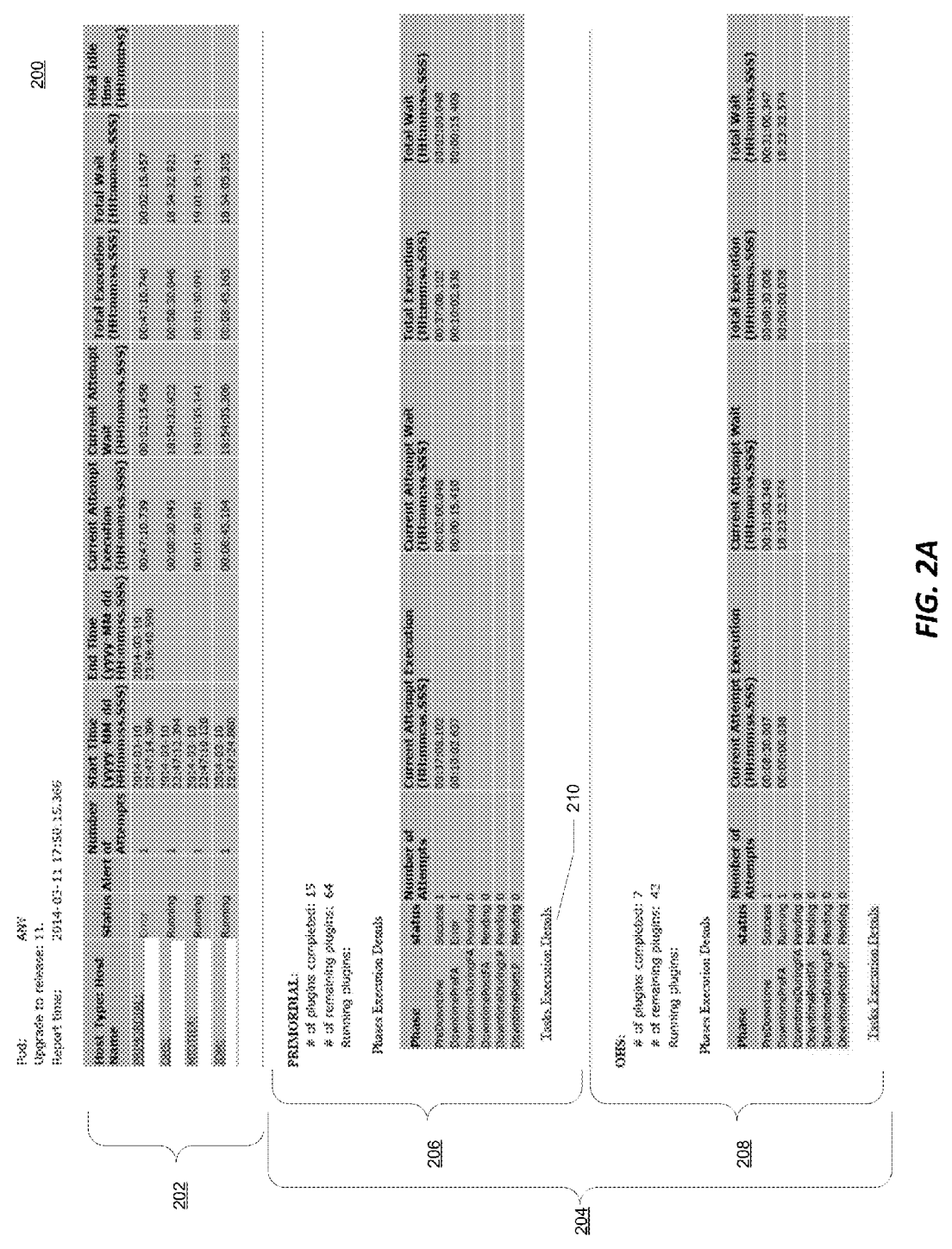

FIG. 2A illustrates an exemplary timing report 200 generated by timing report generator 170 according to an embodiment of the present invention. The exemplary timing report 200 shown in FIG. 2A presents timing data at various granularity levels. Section 202 of report 200 presents the data at a first granularity where an overall image of the overall upgrade operation running on multiple hosts. In FIG. 2A, section 202 shows timing information for four host machines: a PRIMORDIAL host, a OHS host (e.g., a web server host), a MIDTIER host and an Internet Download Manager (IDM) host. The four hosts may be part of a pod; thus, section 202 provides overall timing information at a pod level, including an overview of timing data for all hosts in the pod. For each host machine, a status of the host machine is indicated. Report 200 indicates that PRIMORDIAL host has an "error" status while the status of all other hosts is "running". Other pieces of information depicted in section 202 for each host machine include alert status information, number of execution attempts, the start time of the execution of the upgrade process, the end time of the execution of the upgrade process, the execution time for the current execution attempt, the wait time for the current execution attempt (e.g., an upgrade process hosted on a given host machine may wait for another upgrade process to complete execution prior to starting execution on that host machine), the total execution time of upgrade processes on each host machine, the total wait time, and the total idle time (e.g., when no upgrade processes is running on a host) for each host in the pod. Based on the timing information presented at a first level of granularity in section 202 of the report, a user viewing this information may be interested in learning more about the timing data associated with any given host. For example, the user may be interested in the details of the timing data for the PRIMORDIAL host which is in an error status to find out why an error is indicated.

Section 204 of report 200 comprises timing information at a second level of granularity that is more detailed than information at the first level of granularity displayed in section 202. In section 204, timing information is displayed at a host-level. Within section 204, a separate section of information is shown for each host identified in section 202. For example, as shown in FIG. 2A, section 204 includes a section 206 showing timing data associated with the PRIMORDIAL host and a second section 208 showing timing data associated with the OHS host machine.

The timing information provided in section 204 for a particular host may include various pieces of information specific to that host machine. For example, in the embodiment depicted in FIG. 2A, the information in section 204 for each host machine includes: (a) the number of upgrade processes (or plugins) that have completed execution on the host; (b) the number of upgrade processes (or plugins) that are currently executing or still need to be executed for the host. The displayed information also comprises information for the different phases of the overall upgrade operation on a host. Further, for each phase, information is shown related to: (a) phase identifier, (b) the execution status of the phase, (c) the number of execution attempts for that phases, (d) the execution time for the current execution attempt, (e) the wait time for the current execution attempt, (f) the total execution time, and (g) the total wait time.

Figure 2B:
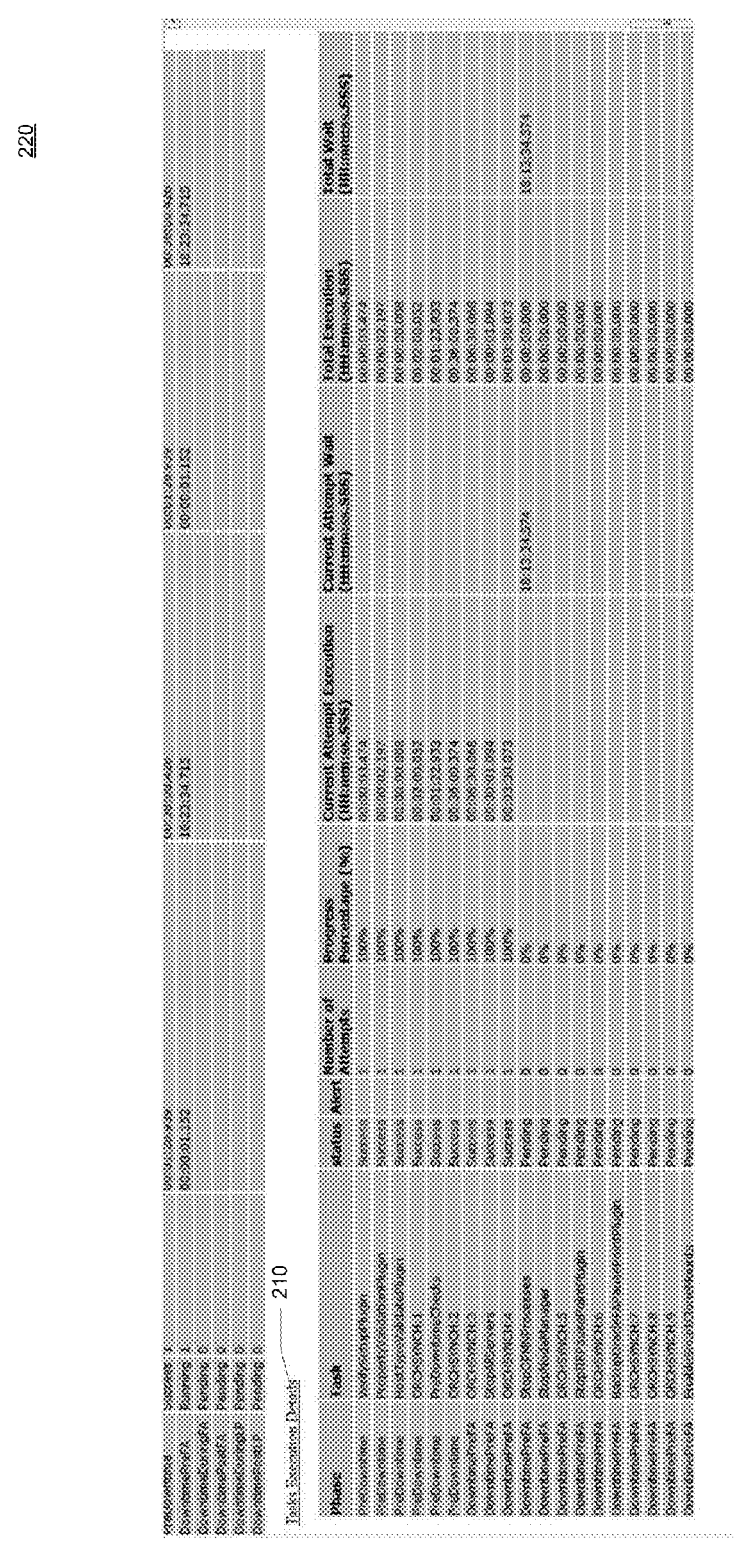

According to some embodiments, multiple upgrade processes (or tasks) may be running on a given host. Timing report 200 may also show, for each host machine, information at the upgrade process or task-level. For example, in section 204, the sections for the host machines each comprise a "Task Execution Details" option or link 210, which when selected by a user shows upgrade process-level information for that host machine. In one embodiment, when "Task Execution Details" is selected, a new timing report 220 illustrated in FIG. 2B is shown. Timing report 220 shows the timing details for each of the upgrade processes (tasks) running on the corresponding host, e.g., the PRIMORDIAL host illustrated in FIG. 2A.

Timing report 200 is generated by the timing tool based upon information read by the timing reporting tool from shared storage. As described above, the upgrade processes involved in the overall upgrade operation are configured to write status information, including timing information, the shared storage location. This information is then read by the timing reporting tool and used to generate the timing report, such as report 200. In certain embodiments, some or all the timing information may be calculated or otherwise generated by the timing reporting tool using the checkpoint data stored in the shared storage.

A timing report such as report 200 depicted in FIG. 2A may be used for various purposes. For example, it may be used to identify problems, e.g., performance problems, in the overall upgrade operation. For example, a user viewing a timing report may use the information shown therein to determine an error condition associated with a host machine and to identify a potential cause of the error. For example, in the embodiment depicted in FIG. 2A, an error status is shown for the PRIMORDIAL host by analyzing the timing information associated with the PRIMORDIAL host. Specifically, based on the high level information provided in section 202 of report 200, the user may identify that an error status is associated with the PRIMORDIAL host machine. Then, reviewing section 206 of report 200, the user may determine that the PRIMORDIAL host is in an error status because one of the upgrade phases did not execute properly, more specifically, the DowntimePreFA phase for which an error is shown in section 206. With this knowledge, the user may restart the execution of the upgrade phase with the associated error condition or take other remedial actions.

The information in a timing report can be updated dynamically as more information becomes available. Accordingly, a timing report, may show information related to upgrade processes that are waiting to be started, upgrade processes that are currently being executed, and/or for upgrade processes that have finished execution. In this manner, the timing report may show updated information, in real time, for an upgrade process as the upgrade process transitions through various stages of its life cycle. As the information displayed in a timing report is updated in real time, the user may use this information to identify any errors while the upgrade operation is in progress and attempt to fix the errors. In some embodiments, the user may include a software tool that may analyze the timing report to identify the errors associated with the upgrade processes or the hosts and automatically implement corrective action.

The timing reports, such as the exemplary timing report 200 illustrated in FIG. 2A, are transparent to the developers of the upgrade processes. Developers do not need to follow any common phrasing or formatting or even provide logs for the upgrade processes for the generation of the timing reports. Similarly, the developers do not need to run or worry about the timing calculations themselves. The timing reporting tool discussed herein performs various timing calculations including timing calculations for parallel execution of two or more upgrade processes. For example, the timing reporting tool may identify overlapping execution times of the two or more upgrade processes while they execute in parallel. For example, if the two upgrade processes have overlapping execution time, the total active time of the host is not a direct sum of the execution sum of the first upgrade process and the second upgrade process. Rather, the timing reporting tool takes into account the overlapping execution time, and does not count such time twice when determining the total execution time of the two upgrade processes on the host. The timing reports are also transparent to the users (e.g., system operators), as they no longer need to maintain all the log archives or move log archives around so that log-based reporting tools can parse the contents.

The timing report depicted in FIGS. 2A and 2B is meant to be an example is not intended to limit the scope of inventive embodiments. The structure, format, and the contents of timing report 200 shown in FIG. 2A are provided for illustration purposes only and should not be construed as limiting. A timing report may be structured in one of various different ways, may have one of various formats, and may comprise different content related to host machines and upgrade processes involved in an overall upgrade operation.

Figure 3:
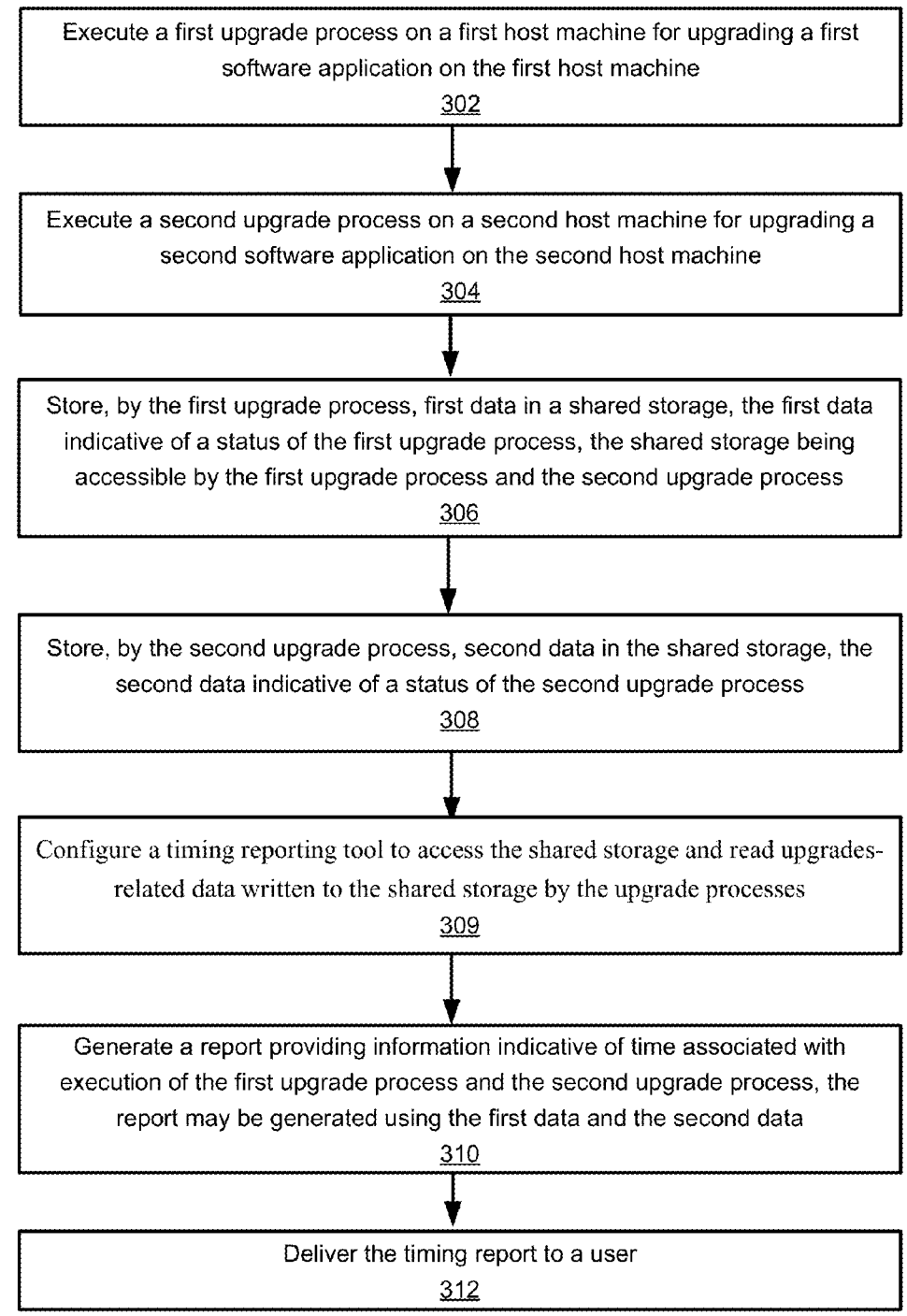
FIG. 3 depicts a simplified flowchart depicting processing performed by an upgrade infrastructure for executing multiple upgrade processes on multiple hosts according to an embodiment of the present invention.

FIG. 3 depicts a simplified flowchart 300 depicting processing performed by the upgrade infrastructure for executing multiple upgrade processes on multiple hosts according to an embodiment of the present invention. The processing depicted in FIG. 3 may be implemented in software (e.g., code, instructions, program) executed by one or more processing units (e.g., processors cores), hardware, or combinations thereof. The software may be stored on a non-transitory computer-readable storage medium (e.g., on a memory device, in memory). The particular series of processing steps depicted in FIG. 3 is not intended to be limiting. In one embodiment, the processing depicted in FIG. 3 is performed by one or more host machines depicted in FIG. 1.

An overall upgrade operation may comprise multiple upgrade processes executing on multiple host machines. For purposes of simplicity, FIG. 3 and the accompanying explanation describes processing with respect to two host machines, namely, a first host machine and a second host machine. This is however not intended to be limiting. The processing depicted in FIG. 3 and explained below can be applied to multiple host machines.

At 302, a first upgrade process is executed on a first host machine for upgrading a first software application on the first host machine. At 304, a second upgrade process is executed on a second host machine for upgrading a second software application on the second host machine. The first and the second upgrade processes may generate data, such as checkpoint data, at various time points during their execution. The data for each upgrade process may include information indicative of a status of that upgrade process when the data is generated.

At 306, the first upgrade process stores first data generated by the first upgrade process in a shared storage. The first data may include information indicative of a status of the first upgrade process. At 308, the second upgrade process stores the second data generated by the second upgrade process in the shared storage. The second data may include information indicative of a status of the second upgrade process. An upgrade process may write data one or more times to the shared storage during its lifetime.

The shared storage is selected such that it accessible to the various upgrade processes involved in the overall upgrade operation, including being accessible to the first upgrade process and the second upgrade process. The shared storage may be pre-configured prior to initiation of the overall upgrade operation. For example, the shared storage may be provided on a central host machine that is accessible by both the first upgrade process and the second upgrade process. The shared storage may also be provided on one of the first host machine or the second host machine.

At 309, a timing reporting tool is configured to access the shared storage and read upgrades-related data written to the shared storage by the upgrade processes. For example, in 309, the timing reporting tool is configured to read the first data and the second data written to the shared storage by the first upgrade process and the second upgrade process respectively.

At 310, the timing reporting tool is configured to generate a timing report based upon the information read in 309. The timing report may comprise information related to the various upgrade processes. For example, in 310, a timing report may be generated comprising information for the first upgrade process and the second upgrade process, the report generated based upon first data and second data read from the shared storage in 309. The report may be generated during the execution of the first upgrade process and/or the second upgrade process.

As previously indicated, the generated report may comprise information at various levels of granularity, e.g., at the overall upgrade operation level, at a host level, at a upgrade process level, and the like. For example, the report generated in 310 may comprise information associated with at least one of the first host machine and the second host machine. The information associated with the first host machine may include various time-related information associated with the execution of the first upgrade process on the first host machine. Similarly, the information for the second host machine may include various time-related information associated with the execution of the second upgrade process on the second host machine. The report may also comprise information at a host-level, e.g., for the first host machine and for the second host machine, such as one or more of a total execution time of that host machine, a total idle time of that host machine and a time that the host machine spent coordinating with other host machine(s).

A timing report may comprise various types of timing information. Some of this timing information may be stored by the upgrade processes to the shared storage and read by the timing reporting tool from the shared tool. The timing reporting tool may also be configured to derive or calculate additional information based upon the information read from the shared storage. Various different techniques may be used by the timing reporting tool for computing this information based upon the information read from the shared storage. [Tie this to the table previously shown in the spec.]

At 312, the report may be sent and output to a user. For example, the report may be communicated to an upgrade console and output via an output device (e.g., a screen or display) of the upgrade console. As another example, the report may be communicated to a client computing device used by a user and output (e.g., displayed) to the user via the client computing device.

As previously described, the contents of a timing report may be dynamically updated as more information is available to the timing tool with passage of time. The timing reporting tool is configured to continuously or periodically monitor the shared storage for updated information written to the shared storage by the upgrade processes, and as such information becomes available, is configured to update any existing timing report with the updated information. The report may be displayed and updated while the first upgrade process and/or the second upgrade process are executing. The report may be dynamically updated based on additional data generated during execution of the first upgrade process and/or the second upgrade process. The report may also be updated to incorporate execution timing information associated with additional host machines, such as a third host machine.

Figure 4:
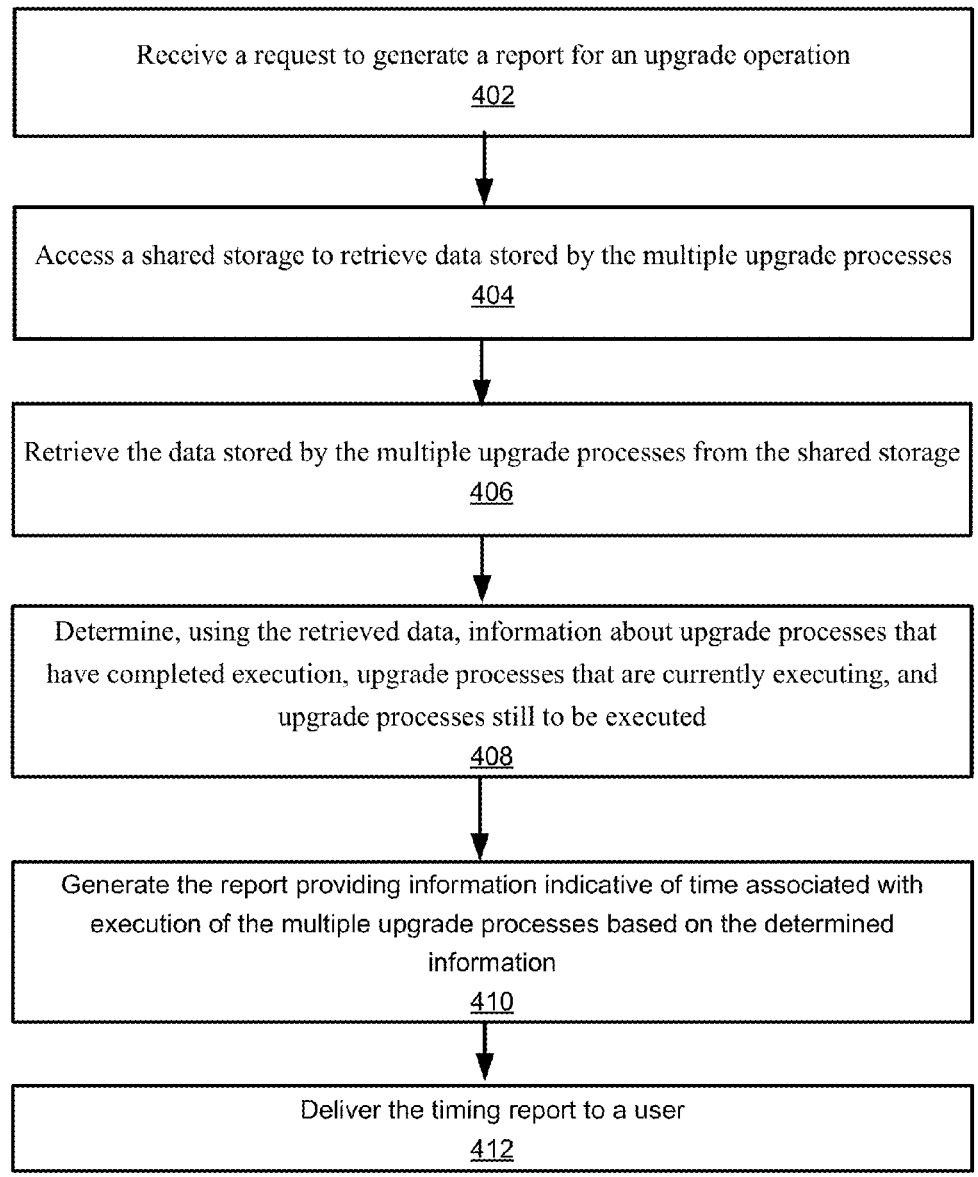
FIG. 4 depicts a simplified flowchart depicting processing performed by a timing reporting tool for generating a report providing information indicative of time associated with execution of a plurality of upgrade processes hosted by one or more hosts, according to an embodiment of the present invention.

FIG. 4 depicts a simplified flowchart 400 depicting processing performed for generating a report providing information indicative of time associated with execution of a plurality of upgrade processes hosted by one or more hosts, according to an embodiment of the present invention. The processing depicted in FIG. 4 may be implemented in software (e.g., code, instructions, program) executed by one or more processing units (e.g., processors, cores), hardware, or combinations thereof. The software may be stored on a non-transitory computer-readable storage medium (e.g., on a memory device, in memory). The particular series of processing steps depicted in FIG. 4 is not intended to be limiting. In one embodiment, the processing depicted in FIG. 4 is performed by one or more host machines depicted in FIG. 1.

At 402, the timing reporting tool receives a request to generate a report for an upgrade operation. The timing reporting tool may be executed by a data processing system and the data processing system may receive the request in 402. In some embodiments, one of the host machines involved in the overall upgrade operation may be configured to execute the timing reporting tool and receive the request in 402.

The request in 402 may be initiated from one or more sources. In certain embodiments, a user may initiate the request using an upgrade console or a user client computing device. In some embodiments, the request may also be generated in response to some event occurring, such as, when a certain time period has passed after initiation of the overall upgrade operation or upon the start of execution of an upgrade process.

The upgrade operation may include multiple upgrade processes hosted by multiple host machines. Each upgrade process may execute on a given host machine for upgrading a software application on that host machine. The upgrade processes may generate data, such as checkpoint data, at various time points during their execution. The data for each upgrade process may include information indicative of a status of that upgrade process at the moment the data is generated. The upgrade processes may store the generated data in a shared storage. The shared storage may be provided on a central host machine that is accessible by all upgrade processes.

At 404, the timing reporting tool may access the shared storage to retrieve data stored by the multiple upgrade processes. At 406, the timing reporting tool may retrieve the data stored by the multiple upgrade processes from the shared storage.

At 408, using the retrieved data, the timing reporting tool may determine information about upgrade processes that have completed, upgrade processes that are currently executing, and upgrade processes still to be executed. According to certain embodiments, the timing reporting tool may determine information about the multiple hosts using the retrieved data. For example, the timing reporting tool may determine a total execution time of each one of the multiple host machines, a total idle time of the host machines and a time that a given host machine spent coordinating with another host machine.

At 410, the timing reporting tool may generate the report providing information indicative of time associated with execution of the multiple upgrade processes based on the determined information. The timing reporting tool may organize the generated report based on a pre-determined criteria. For example, the timing reporting tool may organize the report by upgrade processes, by hosts or, if the hosts are grouped into one or more pods, by pods.

At 412, the timing reporting tool may deliver the report to one or more users. For example, the report may be displayed on a display screen. In certain embodiments, the report may be displayed while the upgrade processes are executing. In such embodiments, the timing report may be dynamically updated based on additional data generated during execution of the upgrade processes. The timing report may also be updated to incorporate execution timing information associated with additional host machines that may be added to the environment where the upgrade operation is performed.

The timing reporting tool discussed herein creates a timing report using checkpoint data generated by the upgrade processes running on one or multiple hosts. The timing report may include data for all hosts and may be presented to a user after the upgrade or during the upgrade. When the report is provided during the upgrade, the report may be dynamically updated to incorporate new timing data generated by the upgrade processes as they execute. Accordingly, the timing report may include historical data, as well as real-time data.

Figure 5:
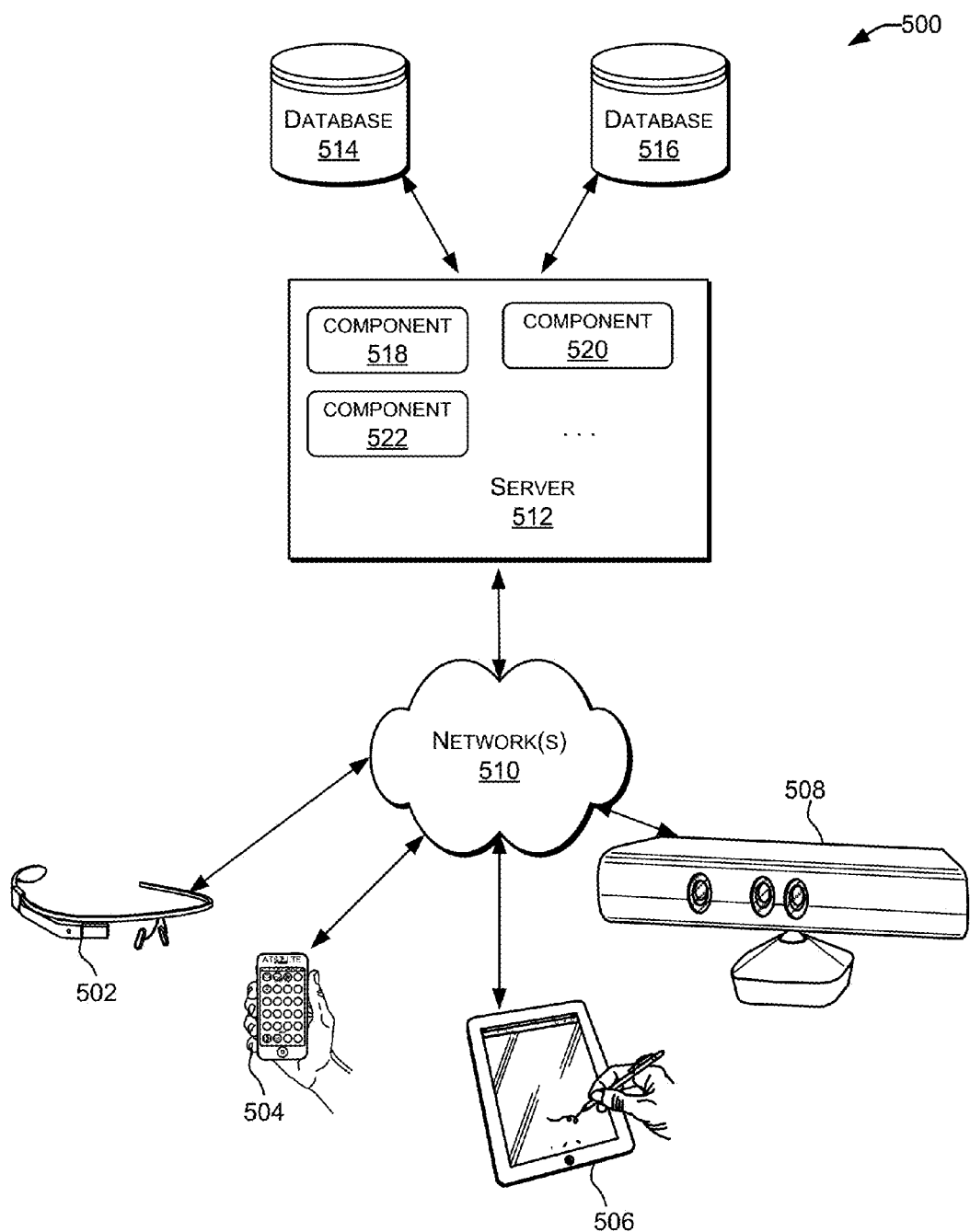
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In some embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like.

Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In some embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
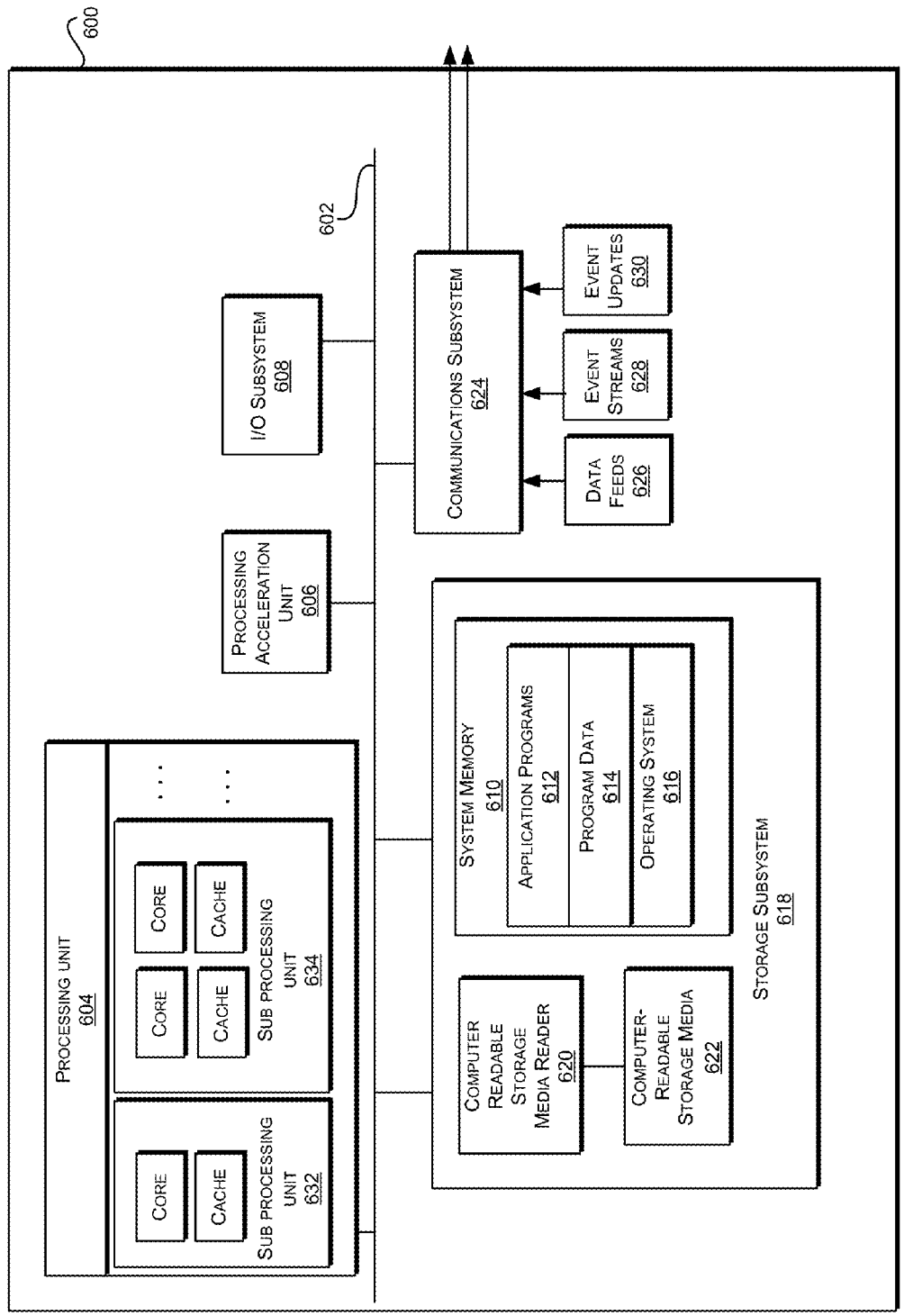
FIG. 6 illustrates an exemplary computer system that may be used to implement an embodiment of the present invention.

FIG. 6 illustrates an exemplary computer system 600, in which some embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In some embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the some embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
executing a first upgrade process on a first host machine for upgrading a first software application on the first host machine;
executing a second upgrade process on a second host machine for upgrading a second software application on the second host machine;
storing, by the first upgrade process, first data in a shared storage, the first data indicative of a status of the first upgrade process;
storing, by the second upgrade process, second data in the shared storage, the second data indicative of a status of the second upgrade process;
reading, by a data processing system, the first data and the second data from the shared storage;
generating, by the data processing system, a report based upon the first data and the second data read from the shared storage, the report comprising timing information associated with the execution of the first upgrade process on the first host machine and the execution of the second upgrade process on the second host machine, wherein the timing information includes a total execution time of the first upgrade process and a time that the first upgrade process spent waiting on the second upgrade process, wherein the time that the first upgrade process spent waiting on the second upgrade process is determined by subtracting a first time from a second time, wherein the first time is a time that the first process started to wait for the second upgrade process, and wherein the second time is a time associated with generating the report; and
communicating the report to a user.

2. The method of claim 1, wherein the report is generated during execution of at least one of the first upgrade process or the second upgrade process.

3. The method of claim 1, further comprising:
displaying, on a display device, the report while the first upgrade process or the second upgrade process is executing; and
dynamically updating the report based on additional data generated during execution of the first upgrade process or the second upgrade process.

4. The method of claim 3, wherein the dynamically updating the report based on additional data further comprises:
reading, by the data processing system, third data written to the shared storage by the first host machine after the report has been generated based upon the first data and the second data; and
updating the report communicated to the user based upon the third data.

5. The method of claim 1, wherein the report provides information associated with the first host machine, the information associated with the first host machine comprises one or more of a total execution time of the first host machine, a total idle time of the first host machine and a time that the first host machine spent coordinating with another host machine.

6. The method of claim 1, wherein the report comprises a number of times the first upgrade process or the second upgrade process re-started executing.

7. The method of claim 1, further comprising modifying the report to incorporate information associated with a third host machine.

8. The method of claim 1, wherein the first upgrade process and the second upgrade process execute concurrently, the method further comprising identifying, on the report, overlapping execution times of the first host machine and the second host machine.

9. The method of claim 1, wherein the report identifies a problem associated with the first upgrade process, the first host machine, the second upgrade process or the second host machine, and the user is a tool that can automatically take corrective action with respect to the problem.

10. The method of claim 1, wherein the timing information further includes at least one of a total time the first upgrade process was idle or a time that the first upgrade process spent coordinating with the second upgrade process.

11. A system comprising:
one or more processors; and
a memory coupled with and readable by the one or more processors, the memory configured to store a set of instructions which, when executed by the one or more processors, causes the one or more processors to:
execute a first upgrade process on a first host machine for upgrading a first software application on the first host machine;
execute a second upgrade process on a second host machine for upgrading a second software application on the second host machine;
store, by the first upgrade process, first data in a shared storage, the first data indicative of a status of the first upgrade process;
store, by the second upgrade process, second data in the shared storage, the second data indicative of a status of the second upgrade process;
read the first data and the second data from the shared storage;
generate a report based upon the first data and the second data read from the shared storage, the report comprising timing information associated with the execution of the first upgrade process on the first host machine and the execution of the second upgrade process on the second host machine, wherein the timing information includes a total execution time of the first upgrade process and a time that the first upgrade process spent waiting on the second upgrade process, wherein the time that the first upgrade process spent waiting on the second upgrade process is determined by subtracting a first time from a second time, wherein the first time is a time that the first process started to wait for the second upgrade process, and wherein the second time is a time associated with generating the report; and
communicate the report to a user.

12. The system of claim 11, wherein the set of instructions, when executed by the one or more processors, further causes the one or more processors to:
display, on a display device, the report while the first upgrade process or the second upgrade process is executing; and
dynamically update the report based on additional data generated during execution of the first upgrade process or the second upgrade process.

13. The system of claim 12, wherein the dynamically updating the report based on additional data further comprises:
read third data written to the shared storage by the first host machine after the report has been generated based upon the first data and the second data; and
update the report communicated to the user based upon the third data.

14. The system of claim 11, wherein the report provides information associated with the first host machine, the information associated with the first host machine comprises one or more of a total execution time of the first host machine, a total idle time of the first host machine and a time that the first host machine spent coordinating with another host machine.

15. The system of claim 11, wherein the report comprises a number of times the first upgrade process or the second upgrade process re-started executing.

16. The system of claim 11, wherein the set of instructions, when executed by the one or more processors, further causes the one or more processors to:
modify the report to incorporate information associated with a third host machine.

17. The system of claim 11, wherein the first upgrade process and the second upgrade process execute concurrently, and wherein the set of instructions, when executed by the one or more processors, further causes the one or more processors to:
identify, on the report, overlapping execution times of the first host machine and the second host machine.

18. A method comprising:
receiving, by a timing reporting tool, a request to generate a report for an upgrade operation, the upgrade operation comprising a plurality of upgrade processes running on a plurality of host machines, wherein the plurality of upgrade processes include a first upgrade process and a second upgrade process;
accessing, by the timing reporting tool, a shared storage to retrieve data stored by the plurality of upgrade processes, wherein the plurality of upgrade processes store data indicative of a status of the plurality of upgrade processes in the shared storage;
reading, by the timing reporting tool, the data stored by the plurality of upgrade processes from the shared storage;
determining, by the timing reporting tool, information about the plurality of upgrade processes using the retrieved data, the information including information about upgrade processes that have completed execution, upgrade processes that are currently executing, and upgrade processes to be executed;
generating the report based upon the data read from the shared storage, the report comprising timing information associated with an execution of the plurality of upgrade processes running on the plurality of host machines, wherein the timing information includes a total execution time of the first upgrade and a time that the first upgrade process spent waiting on the second upgrade process, wherein the time that the first upgrade process spent waiting on the second upgrade process is determined by subtracting a first time from a second time, wherein the first time is a time that the first process started to wait for the second upgrade process, and wherein the second time is a time associated with generating the report; and
communicating the report to a user.

19. The method of claim 18, wherein the report is generated during execution of at least one of the plurality of upgrade processes.

20. The method of claim 19, further comprising:
dynamically updating the report based on additional data generated during the execution of at least one of the plurality of upgrade processes.

21. The method of claim 18, further comprising:
modifying the report to incorporate information associated with an additional host machine.

22. The method of claim 18, wherein the report identifies a problem associated with one or more of the plurality of upgrade processes or one or more of the plurality of host machines, and the user is a tool that can automatically take corrective action with respect to the problem.

\* \* \* \* \*

UNITED STATES PATENT AND TRADEMARK OFFICE
CERTIFICATE OF CORRECTION

| | |
|---|---|
| PATENT NO. | : 9,753,717 B2 |
| APPLICATION NO. | : 14/935112 |
| DATED | : September 5, 2017 |
| INVENTOR(S) | : Fang Hu, Chi Kin Vong and Tim Richardson |

It is certified that error appears in the above-identified patent and that said Letters Patent is hereby corrected as shown below:

In the Drawings

Please replace Drawings sheets 2 and 3 with the attached replacement sheets containing FIGS. 2A and 2B In the Specification TABLE 1:
Column 9-10, under Header: Upgrade Phase Level, Line 6:
Remove "rerun" and replace with --rerun.--
Column 9-10, under Header: Host Level, Approximately Line 67:
Remove "Sum(earchRun_HostExecutionTime)" and replace with
--Sum(eachRun_HostExecutionTime)--

In the Claims

Claim 18:
Column 26 Line 50; after the word "upgrade" add the word --process--

Signed and Sealed this
Twelfth Day of March, 2019

Andrei Iancu
*Director of the United States Patent and Trademark Office*

Pod: ANY
Upgrade to release: 11.
Report Time: 2014-03-11 17:50:15.366

200

| Host Type: Host Name | Status | Alert | Number of Attempts | Start Time (yyyy-MM-dd HH:mm:ss.SSS) | End Time (yyyy-MM-dd HH:mm:ss.SSS) | Current Attempt Execution (HH:mm:ss.SSS) | Current Attempt Wait (HH:mm:ss.SSS) | Total Execution (HH:mm:ss.SSS) | Total Wait (HH:mm:ss.SSS) | Total Idle Time (HH:mm:ss) |
|---|---|---|---|---|---|---|---|---|---|---|
| PRIMORDIAL: | Error | | 1 | 2014-03-10 22:47:14.386 | 2014-03-10 23:36:40.590 | 00:47:10.739 | 00:02:15.458 | 00:47:10.740 | 00:02:15.457 | |
| OHS: | Running | | 1 | 2014-03-10 22:47:12.394 | | 00:08:30.045 | 18:54:32.922 | 00:08:30.046 | 18:54:32.921 | |
| MIDTIER: | Running | | 1 | 2014-03-10 22:47:10.128 | | 00:01:30.091 | 19:01:35.141 | 00:01:30.091 | 19:01:35.141 | |
| IDM: | Running | | 1 | 2014-03-10 22:47:24.880 | | 00:08:45.164 | 18:54:05.306 | 00:08:45.165 | 18:54:05.305 | |

202

PRIMORDIAL:
# of plugins completed: 15
# of remaining plugins: 64
Running plugins:
Phases Execution Details

| Phase | Status | Number of Attempts | Current Attempt Execution (HH:mm:ss.SSS) | Current Attempt Wait (HH:mm:ss.SSS) | Total Execution (HH:mm:ss.SSS) | Total Wait (HH:mm:ss.SSS) |
|---|---|---|---|---|---|---|
| PreDowntime | Success | 1 | 00:37:08.102 | 00:02:00.048 | 00:37:08.102 | 00:02:00.048 |
| DowntimePreFA | Error | 1 | 00:10:02.637 | 00:00:15.410 | 00:10:02.638 | 00:00:15.409 |
| DowntimeDuringFA | Pending | 0 | | | | |
| DowntimePostFA | Pending | 0 | | | | |
| DowntimeDuringLP | Pending | 0 | | | | |
| DowntimePostLP | Pending | 0 | | | | |

Tasks Execution Details — 210

206

OHS:
# of plugins completed: 7
# of remaining plugins: 42
Running plugins:
Phases Execution Details

| Phase | Status | Number of Attempts | Current Attempt Execution (HH:mm:ss.SSS) | Current Attempt Wait (HH:mm:ss.SSS) | Total Execution (HH:mm:ss.SSS) | Total Wait (HH:mm:ss.SSS) |
|---|---|---|---|---|---|---|
| PreDowntime | Success | 1 | 00:08:30.007 | 00:31:00.348 | 00:08:30.008 | 00:31:00.347 |
| DowntimePreFA | Running | 1 | 11:11:11.038 | 18:23:32.574 | 00:00:00.038 | 18:23:32.574 |
| DowntimeDuringFA | Pending | 0 | | | | |
| DowntimePostFA | Pending | 0 | | | | |
| DowntimeDuringLP | Pending | 0 | | | | |
| DowntimePostLP | Pending | 0 | | | | |

Tasks Execution Details

| | | | | | | |
|---|---|---|---|---|---|---|
| PreDowntime | Success | 1 | | 00:01:28.939 | 00:38:00.426 | 11:01:28.939 | 00:38:00.426 |
| PreDowntime | Running | 1 | | 00:00:01.152 | 18:23:34.715 | 00:00:01.152 | 18:23:34.715 |
| PreDowntime | Pending | 0 | | | | | |
| PreDowntime | Pending | 0 | | | | | |
| PreDowntime | Pending | 0 | | | | | |
| PreDowntime | Pending | 0 | | | | | |

Tasks Execution Details — 210

| Phase | Task | Status | Alert | Number of Attempts | Progress Percentage (%) | Current Attempt Execution (HH:mm:ss.SSS) | Current Attempt Wait (HH:mm:ss.SSS) | Total Execution (HH:mm:ss.SSS) | Total Wait (HH:mm:ss.SSS) |
|---|---|---|---|---|---|---|---|---|---|
| PreDowntime | VerifySetupPlugin | Success | | 1 | 100% | 00:00:03.474 | | 00:00"03.474 | |
| PreDowntime | PropertyValidation Plugin | Success | | 1 | 100% | 00:00:02.197 | | 00:00:02.197 | |
| PreDowntime | HostTypeValidatePlugin | Success | | 1 | 100% | 00:00:00.008 | | 00:00:00.008 | |
| PreDowntime | ORCHSYNCH:1 | Success | | 1 | 100% | 00:02:00.052 | | 00:02:00.052 | |
| PreDowntime | PredowntimeChecks | Success | | 1 | 100% | 00:01:22.933 | | 00:01:22.933 | |
| PreDowntime | ORCHSYNCH:2 | Success | | 1 | 100% | 00:36:00.374 | | 00:36:00.374 | |
| DowntimePreFA | ORCHSYNCH:3 | Success | | 1 | 100% | 00:06:30.068 | | 00:06:30.068 | |
| DowntimePreFA | StopAllServers | Success | | 1 | 100% | 00:00:01.094 | | 00:00:01.094 | |
| DowntimePreFA | ORCHSYNCH:4 | Success | | 1 | 100% | 00:03:30.073 | | 00:03:30.073 | |
| DowntimePreFA | StopOPMNProcesses | Pending | | 0 | 0% | | 18:13:34.574 | | 18:13:34.574 |
| DowntimePreFA | StopNodeManager | Pending | | 0 | 0% | | | 00:00:00.000 | |
| DowntimePreFA | ORCHSYNCH:5 | Pending | | 0 | 0% | | | 00:00:00.000 | |
| DowntimePreFA | StopIIRPausePointPlugin | Pending | | 0 | 0% | | | 00:00:00.000 | |
| DowntimePreFA | ORCHSYNCH:6 | Pending | | 0 | 0% | | | 00:00:00.000 | |
| DowntimePreFA | BackupOracleFAPausePointPlugin | Pending | | 0 | 0% | | | 00:00:00.000 | |
| DowntimePreFA | ORCHSYNCH:7 | Pending | | 0 | 0% | | | 00:00:00.000 | |
| DowntimePreFA | ORCHSYNCH:8 | Pending | | 0 | 0% | | | 00:00:00.000 | |
| DowntimePreFA | ORCHSYNCH:9 | Pending | | 0 | 0% | | | 00:00:00.000 | |
| DowntimePreFA | EnableSmartClineMounts | Pending | | 0 | 0% | | | 00:00:00.000 | |